235-380
4/15/80
SR
XR 4,198,619

United States Patent [19]

Atalla

[11] 4,198,619

[45] Apr. 15, 1980

[54] PROGRAMMABLE SECURITY SYSTEM AND METHOD

[75] Inventor: Martin M. Atalla, Portola Valley, Calif.

[73] Assignee: Atalla Technovations Corporation, Sunnyvale, Calif.

[21] Appl. No.: 879,784

[22] Filed: Feb. 21, 1978

Related U.S. Application Data

[63] Continuation of Ser. No. 736,436, Oct. 28, 1976.

[51] Int. Cl.[2] .......... G05B 1/03; G07F 7/02; G07F 7/10

[52] U.S. Cl. .......... 340/149 A; 235/380; 235/381

[58] Field of Search .......... 340/149 R, 149 A; 235/380, 381

[56] References Cited

U.S. PATENT DOCUMENTS

| | | | |
|---|---|---|---|
| 3,492,656 | 1/1970 | Hildebrandt | 340/168 R |
| 3,611,293 | 10/1971 | Constable et al. | 340/149 A |
| 3,702,392 | 11/1972 | St. Jean | 235/380 |
| 3,862,716 | 1/1975 | Black et al. | 235/381 |
| 3,938,091 | 2/1976 | Atalla et al. | 340/149 A |
| 3,956,615 | 5/1976 | Anderson et al. | 235/379 |
| 3,985,998 | 10/1976 | Crafton | 340/149 A |
| 3,990,558 | 11/1976 | Ehrat | 194/4 R |
| 4,023,012 | 5/1977 | Ano et al. | 340/149 A |
| 4,023,013 | 5/1977 | Kinker | 340/149 A |
| 4,032,931 | 6/1977 | Haker | 340/149 A |

FOREIGN PATENT DOCUMENTS

| | | |
|---|---|---|
| 2278115 | 6/1976 | France . |
| 1223529 | 2/1971 | United Kingdom . |
| 1458646 | 12/1976 | United Kingdom . |

OTHER PUBLICATIONS

*IBM Technical Disclosure Bulletin*, vol. 14, No. 2, Jul. 1971, pp. 516; 577, "Password Generation For Encrypting by Exclusive or'ing", J. F. Soldini.

*Primary Examiner*—Donald J. Yusko
*Attorney, Agent, or Firm*—A. C. Smith

[57] ABSTRACT

A code-word security system uses a logic module which can receive an account code word (or any other data that is specific to an individual) and a secret code word from an individual for encoding in accordance with a logical combination of such code words altered in accordance with a selectable control word to produce a compiled code word of fixed length. Such compiled code words may be stored and retrieved for comparison with a compiled code word similarly generated during the course of an authorized transaction by such individual, or may be transmitted with coded information and other data pertaining to such authorized individual for logical manipulation.

2 Claims, 3 Drawing Figures

PROGRAMMABLE SECURITY SYSTEM AND METHOD

This application is a continuation of application Ser. No. 736,436, filed Oct. 28, 1976

BACKGROUND AND SUMMARY OF TH INVENTION

Certain known security systems rely on the most sophisticated memory system available, i.e., the human brain, to secure digital data against unauthorized use or manipulation. Systems of this type accept account codes and also secret codes from an individual for encoding in accordance with a coding scheme that is controlled by such code words to yield a compiled code word of fixed word length despite the length of the applied code words (see, for example, U.S. Pat. No. 3,938,091, entitled "Personal Verification System", issued on Feb. 10, 1976). One difficulty encountered in a security system of this type is that a vast number of institutions relying in common upon such security systems require additional security against possible interactions of such encoded data between institutions, or between different stations within an institution.

Accordingly, in accordance with a preferred embodiment of the present invention, an additional control word is applied to the encoding logic to establish a unique encryption scheme for a given institution, or at a given secured location which is a function of the control word. Thus, a large number of the order of one billion distinctive encryption schemes may by provided for operation on a comparably large number of different combinations of code words that may possibly be applied thereto.

DESCRIPTION OF THE PREFERRED EMBODIMENT

U.S. Pat. No. 3,938,091 is fully incorporated herein and by this reference is made a part hereof.

Figure 1:
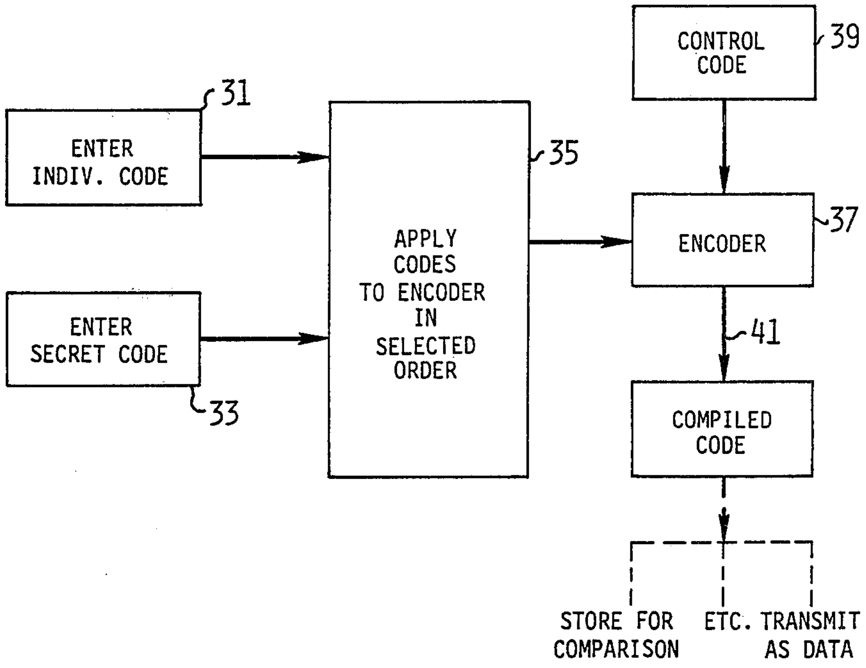
FIG. 1 is a logic flow chart illustrating the operation of the present invention.
Figure 2:
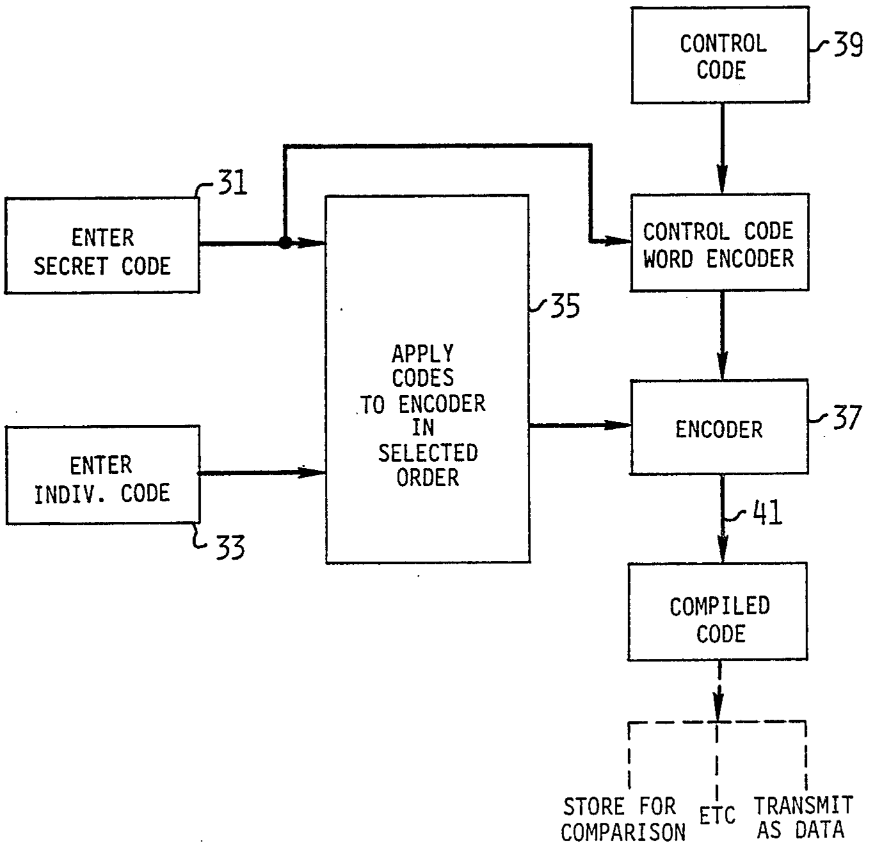
FIG. 2 is a logic flow chart illustrating the operation of another embodiment of the present invention.

In addition, with reference to FIGS. 1 and 2 hereof, there are shown logic flow charts that illustrate the interrelationships between the various code word inputs in the operation of the present invention. In one embodiment the identifying code word (e.g., social security number, account number, driver's license number, etc., or combinations thereof) for an individual may be entered using a suitable code word entry means 31 such as a keyboard, a card reader, or the like. Similarly, a secret code word for the individual may be entered by the individual using the same or another suitable code word entry means 33 of the type discussed above.

These code words are converted to digital signals which may or may not be buffered or temporarily stored 35 for application to the encoder 37 in a selected order, independently of the order in which the code words are received from the individual.

In accordance with the present invention, the encoding of an individual's own identifying code and his secret code in accordance with an encoding scheme is further altered or determined by the introduction of a control code word 39 which may be unique to the particular institution, or which may be unique to a particular data terminal in an institution. The encoder output is a compiled code word which may be of fixed word length (e.g., always digits, independently of the length of the entered code words 31, 33). This compiled code word may thereafter be recorded for subsequent retrieval and comparison with a compiled code word prepared in the same manner for an individual who attempts to complete a transaction that is secured by the present invention. Alternatively, the compiled code word may be considered as data and transmitted along with other data (e.g., inventory numbers, price information, etc.) for remote processing.

Figure 3:
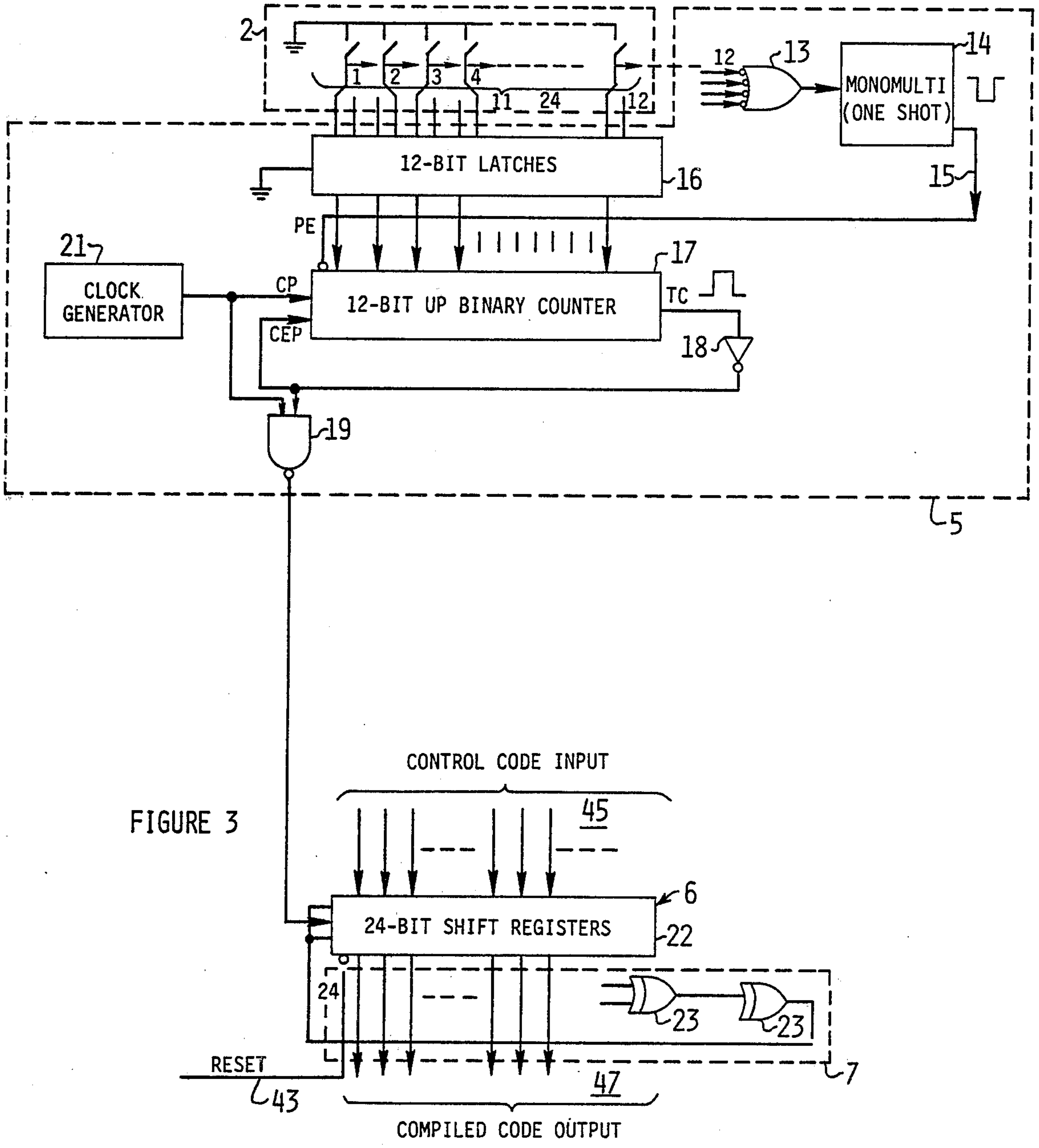
FIG. 3 is a schematic diagram of one circuit embodiment according to the present invention.

Referring now to FIG. 3, there is shown a simplified schematic diagram of one embodiment of the present invention in which the identifying code word and the secret code word for an individual are entered in selected order using the same manual keyboard entry means 2. The individual keys 11 of the keyboard 2 are individually connectable to a grounded bus 12 by depressing or actuating the key. One output from each of the keys 11 is fed to the corresponding input of a NAND gate 13 for generating an output which triggers a one-shot 14 to produce a negative pulse on line 15. Each of the individual keys 11 is also connected to a corresponding input of a 12-bit latch 16, such 12-latch 16 being formed, for example, by three Model 9322 integrated circuits. Thus, whenever a key 11 is depressed, one of the lines connected with the key provides a 0 (low) signal to both the 12-bit latch 16 and the NAND gate 13.

The output of the NAND gate 13 fires the one-shot 14 to generate a negative-going pulse to the parallel enable input 15 of a 12-bit UP binary counter 17 to load the 12-bit latch 16 contents into the 12-bit UP binary counter 17. Initially, the 12-bit UP binary counter 17 is resting at an all 1state, i.e., the terminal count output is a "high" which when inverted through an inverter 18 provides a "low" to the count enable pulse input terminal of the 12-bit binary counter 17 is disable the binary counter 17. The binary counter 17 comprises, for example, three Model 9316 integrated circuits.

As soon as a key 11 is depressed, a set of twelve bits is loaded from the latch 16 into the binary counter 17 and the terminal count on the binary counter 17 drops to a low which when inverted by inverter 18 produces a high count enable pulse causing the binary counter 17 to count from the loaded state up to an all 1 state which makes the terminal count high. The high is inverted by inverter 18 to a low which disables the binary counter 17 to terminate the counting function. Thus, the output of the inverter 18 is a high pulse of a duration corresponding to the time it takes the binary counter 17 to count clock pulses from the state loaded into the binary counter to a terminal all 1 state. Thus, the operating time of the counter 17 is a function of the bit state loaded into the binary counter 17, which in turn depends upon which one of the individual keys 11 was depressed.

The output of the inverter 18 is also fed to one input of a NAND gate 19 to which the output of the clock generator 21 is also connected. Thus, the NAND gate 19 serves to gate the clock pulses to the input of a 24-bit shift register 22. The number of clock pulses which are gated to the shift register 22 is dependent upon the duration of the count of the binary counter 17. The 24-bit shift register 22 may comprise, for example, six Model 9300 integrated circuits.

Thus, the NAND gate 13, one-shot 14, latch 16, binary counter 17, clock generator 21, inverter 18 and gate 19 serve to form the key-to-clock pulse translator 5 as described above with regard to FIG. 2. The output of the key-to-clock pulse translator 5 is a train of pulses with the number of pulses in each train corresponding to the particular key actuated on the alpha-numeric keyboard 2.

A plurality of exclusive OR gates 23 are hard wired into the 24-bit shift register 22 in the conventional manner to provide a plurality of feedback paths to the input of the 24-bit feedback shift register 22 for pseudo-randomizing the states of the register 22. The 24-bit shift register 22 is initialized to an all 0 for starting state by applying a reset pulse on input line 43. Additionally, the 24-bit cells of the shift register 22 may be selectively preset to initial conditions determined by the signals on input lines 45 to each bit cell. Thus, the final state of the shift register 22, as manifested by the logic states on the output lines 47 from the bit cells, after all code words for an individual are entered in succession via keyboard 2 will be determined by the control code applied to inputs 45. The output lines 47 may be grouped into any suitable number, K, of n-bit alphanumeric characters for transmission as data, or for display or comparison with similar output signals in the manner described in the aforecited U.S. patent, or the like. The control code thus greatly expands the combinations of compiled code words which may be generated as a result of certain code words applied to the code entry means. In addition, the control code and the associated encoding may be further secured against unauthorized use by modifying the control code in accordance with the secret code word received from the individual, as illustrated in FIG. 2. In this embodiment, the secret code word may be combined with a control code (for example, Route and Transit number for a given bank) to yield an encoded control code word for application to the input 45 of shift register 22, as shown in FIG. 3. This encoding of the control code word with the secret code word may be performed in any suitable manner, for example, by arithmetically adding or subtracting, multiplying or dividing one number by the other, or by interdigitizing the digits of one number with the digits of the other number, or the like.

Therefore, the security system of the present invention provides greatly enhanced security for many institutions using similar systems through the selection of their own control codes.

I claim:

1. The method of operating a personal verification system including encoding means having an input for receiving a control code input representative of the location, and a code word input means coupled to the encoding means and operable for verifying the authority of an individual to complete transactions on the basis of the combination of an individual code word which is peculiar to the individual, a secret code word which need only be known to the individual, a control code representative of the location, and a compiled code word which is derived from the other of the code words, the method comprising the steps, performed in selected sequence, of:

preparing a logical encoding status at the location in accordance with a selected logical combination of the control code for the location, the individual code word and a secret code word received from the individual prior to verification of his authority to complete a transaction;

encoding the combination of the control code for the location, the individual code word and the secret code word received from the individual by logically combining the control code for the location and the secret code word received from the individual to produce an encrypted control code, and by encoding the combination of the encrypted control code, the individual code word and the secret code word received from the individual in accordance with said logical encoding status to produce a compiled code word therefrom;

preparing a record of said compiled code word for subsequent use in verifying the authority of the individual to complete a transaction;

applying to the code word input means of the system both an individual code word for identifying the individual attempting to complete a transaction and a secret code word from such individual;

preparing a logical encoding status in the encoding means of the system in accordance with said logical combination of the control code for the location, the individual code word and secret code word applied to the code word input means of the system;

encoding the combination of the control code for the location, the individual code word and the secret code word applied to the code word input means by logically combining the control code for the location and the secret code word received from the individual to produce an encrypted control code, and by encoding the combination of the encrypted control code, the individual code word and the secret code word received from the individual in accordance with said logical encoding status prepared in the encoding means of the system to produce a corresponding compiled code word therefrom;

comparing said corresponding compiled code word with the compiled code word from said record for the authorized individual having such individual code word; and controlling completion of the transaction in response to the comparison of the compiled code word from said record with said corresponding compiled code word produced from the control code for the location, the applied individual code word and secret code word received from the individual attempting to complete the transaction.

2. Apparatus for verifying the authority of an individual to complete a transaction on the basis of logical manipulation of a control code word indicative of an encoding location, an individual's identifying code word, his secret code word and an encoded word logically derived from such code words, the apparatus comprising:

encoding means providing a variable encoding operation which is a function of the logical combination of all code words applied thereto for producing an encoded word therefrom in accordance with said encoding operation which is also determined by said secret code word;

auxiliary encoding means coupled to receive the control code word and the individual's secret code word for producing an encrypted control code word in accordance with a logical combination thereof for application to said encoding means;

input means coupled to said encoding means for applying thereto an individual's identifying code word and the individual's secret code word for providing said encoding operation therefrom in accordance with said logical combination of the encrypted control code word, the individual's identifying code word and secret code word, said encoding means producing said encoded word for the individual in an initial transaction in accordance with said encoding operation from the encrypted control code word, the applied individual's identifying code word and secret code word;

said encoding means also providing an encoded word in a subsequent transaction by encoding the combination of the encrypted control code word, the authorized individual's identifying code word and secret code word in accordance with a variable encoding operation which is determined by said logical combination of the encrypted control code word, the authorized individual's identifying code word and secret code word; and means for comparing said encoded word prepared for the authorized individual in the initial transaction with said encoded word produced during the course of a subsequent transaction to complete the transaction with respect to said individual's identifying code word in response to comparison of said encoded words.

* * * * *